US00RE48701E

(19) United States
(12) Reissued Patent
Coresh

(10) Patent Number: US RE48,701 E
(45) Date of Reissued Patent: Aug. 24, 2021

(54) SHAVING RAZOR WITH ONE OR MORE RECIPROCATING BLADES

(71) Applicant: Winning Technologies Ltd., Modi'in (IL)

(72) Inventor: Leon Coresh, Tel Aviv (IL)

(73) Assignee: Winning Technologies Ltd., Modi'in (IL)

(21) Appl. No.: 16/390,387

(22) Filed: Apr. 22, 2019

Related U.S. Patent Documents

Reissue of:
(64) Patent No.: 9,630,332
Issued: Apr. 25, 2017
Appl. No.: 14/500,217
Filed: Sep. 29, 2014

(51) Int. Cl.
*B26B 21/38* (2006.01)
*B26B 21/40* (2006.01)
*B26B 21/22* (2006.01)

(52) U.S. Cl.
CPC ..... *B26B 21/38* (2013.01); *B26B 21/222* (2013.01); *B26B 21/405* (2013.01); *B26B 21/4062* (2013.01)

(58) Field of Classification Search
None
See application file for complete search history.

(56) References Cited

U.S. PATENT DOCUMENTS 3,413,718 A * 12/1968 Baumann ..... B26B 19/10 30/34.1
3,631,595 A * 1/1972 Scott ..... B26B 21/38 30/45
4,174,569 A * 11/1979 Schenk ..... B26B 19/26 30/43.3
4,744,144 A * 5/1988 Lowery, Sr. ..... B26B 21/38 30/45
5,152,064 A * 10/1992 Johnston ..... B26B 21/225 132/200
D343,922 S * 2/1994 Ahlgren ..... D28/46
5,307,564 A * 5/1994 Schoenberg ..... B26B 21/14 30/47
5,504,997 A * 4/1996 Lee ..... B26B 19/02 30/34.1
5,732,470 A * 3/1998 Labarbara ..... B26B 21/38 30/44
5,794,342 A * 8/1998 Davey ..... B26B 21/38 30/43.92
D423,143 S * 4/2000 Cowell ..... D28/46
(Continued)

FOREIGN PATENT DOCUMENTS

CA 2731538 A1 * 1/2010
CA 2942900 A1 * 9/2015
(Continued)

OTHER PUBLICATIONS

International Search Report and Written Opinion of the ISA in PCT/US2015/51265 mailed Dec. 17, 2015. 7 pages.

*Primary Examiner* — Glenn K Dawson
(74) *Attorney, Agent, or Firm* — Thomas Coester Intellectual Property

(57) ABSTRACT

A shaving razor having a handle and a shaving head with an exposed reciprocating blade. A power source is disposed within the handle with an actuator that causes at least one blade of a multi-blade razor head to reciprocate within a zone of motion. Other embodiments are also described and claimed.

15 Claims, 5 Drawing Sheets

(56) References Cited

U.S. PATENT DOCUMENTS 6,158,126 A * 12/2000 Rose, Jr. ..... B26B 19/282 30/43.92
6,161,288 A * 12/2000 Andrews ..... B26B 21/00 30/50
6,434,828 B1 * 8/2002 Andrews ..... B26B 21/00 30/50
6,442,840 B2 * 9/2002 Zucker ..... 30/50
6,502,312 B2 * 1/2003 Beutel ..... B26B 19/063 30/216
7,086,160 B2 * 8/2006 Coffin ..... B26B 21/222 30/50
7,797,834 B2 * 9/2010 Steunenberg ..... B26B 21/38 30/50
8,479,398 B2 * 7/2013 Coresh ..... B26B 21/225 30/50
8,595,940 B2 * 12/2013 Coresh ..... B26B 21/22 30/50
8,707,561 B1 * 4/2014 Kneier ..... B26B 19/42 30/50
8,726,517 B2 * 5/2014 Lau ..... B26B 19/28 30/34.1
9,144,914 B2 * 9/2015 Coresh ..... B26B 21/225
9,457,486 B2 * 10/2016 Coresh ..... B26B 21/4031 30/50
9,630,332 B2 * 4/2017 Coresh ..... B26B 21/38
9,821,480 B2 * 11/2017 Coresh ..... B26B 21/4012
10,357,891 B2 * 7/2019 Coresh ..... B26B 21/528
10,414,057 B2 * 9/2019 Ntavos ..... B26B 21/227
10,500,746 B2 * 12/2019 Coresh ..... B26B 21/405
2005/0188540 A1 * 9/2005 Kelly ..... B26B 21/38 30/45
2006/0064875 A1 * 3/2006 Follo ..... B26B 21/4012 30/34.1
2008/0034592 A1 2/2008 Smith et al.
2011/0131812 A1 * 6/2011 Erndt ..... B26B 19/063 30/34.1
2012/0151772 A1 * 6/2012 Moon ..... B26B 21/225 30/50
2013/0160296 A1 6/2013 Park et al. ..... B26B 21/52 30/34.05
2014/0259677 A1 * 9/2014 Coresh ..... B26B 21/4031 30/50
2015/0266192 A1 * 9/2015 Coresh ..... B26B 21/521 30/526
2016/0001454 A1 * 1/2016 Coresh ..... B26B 21/22 30/50

FOREIGN PATENT DOCUMENTS

GB 184913 A 8/1922
GB 290796 A 5/1928
GB 2462086 A * 1/2010
KR 20140053107 A * 5/2014
WO WO 2010010517 A3 * 6/2010
WO WO 2013003484 A3 * 4/2013
WO WO 2015142526 A1 * 9/2015
WO WO 2016053664 A1 * 4/2016

* cited by examiner

SHAVING RAZOR WITH ONE OR MORE RECIPROCATING BLADES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Field

Embodiments of the invention relate to a shaving razor. More particularly, embodiments of the invention relate to a shaving razor having at least one exposed reciprocating blade.

Background

There are two main classes of shaving razors that dominate the market. There are electric razors, which have one or more cutting implements behind a screen or other protective barrier, where the cutting elements are powered to, for example, spin such that hair penetrating the screen or barrier is cut. The advantage of these types of razors is after the initial purchase, a large number of shaves are possible without replacing the device or parts thereof. Unfortunately, electric razors are typically somewhat bulky, making it difficult to get into tight spaces, for example, around a user's nose. Additionally, even in open spaces such as a user's cheek, the closeness of the shave generally does not match that which is possible with exposed-blade razors. This lack of closeness is due at least impart to the dimension of the barrier. Even relatively thin micro-screens have a thickness that dictates the maximum closeness of the shave. That is, the shave can be no closer than the thickness of the screen.

The second class of razors in common use today is exposed-blade razors, which have one or more blades arranged in a cartridge. A user pulls the cartridge across the area to be shaved, and the blades provide a shave that is generally closer than possible with an electric razor, owing to the fact that the blades are in direct contact with the user's skin and the dimension of the protective shield of the electric razors need not be accommodated. Commonly, three, four, or even five blades are aligned to cut in the same shaving direction. Even where multiple blades are present, the leading blade performs the most of the cutting. As used herein, "leading" when modifying blade refers to the first blade to come in contact with the hair in the direction of shaving. As a result, the leading blade dulls more quickly than the other blades. Often, the dullness of the leading blade requires replacement of the cartridge while the remaining blades are perfectly serviceable.

Some razor manufacturers have come up with "power" models of their exposed blade razors. These razors include a battery in the handle and a motor with an eccentric mass such that when powered, the entire razor vibrates. In these models, the blades do not actually move; rather, the entire device vibrates. This feature has been heavily advertised, but market research reflects that it fails to provide any real benefit to the user, and the majority of users do not replace the battery once it goes dead. Studies have not revealed that power models have longer cartridge life or improved cutting efficacy over the unpowered models. Rather, these "power" exposed blade razors appear to be little more than a marketing gimmick

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
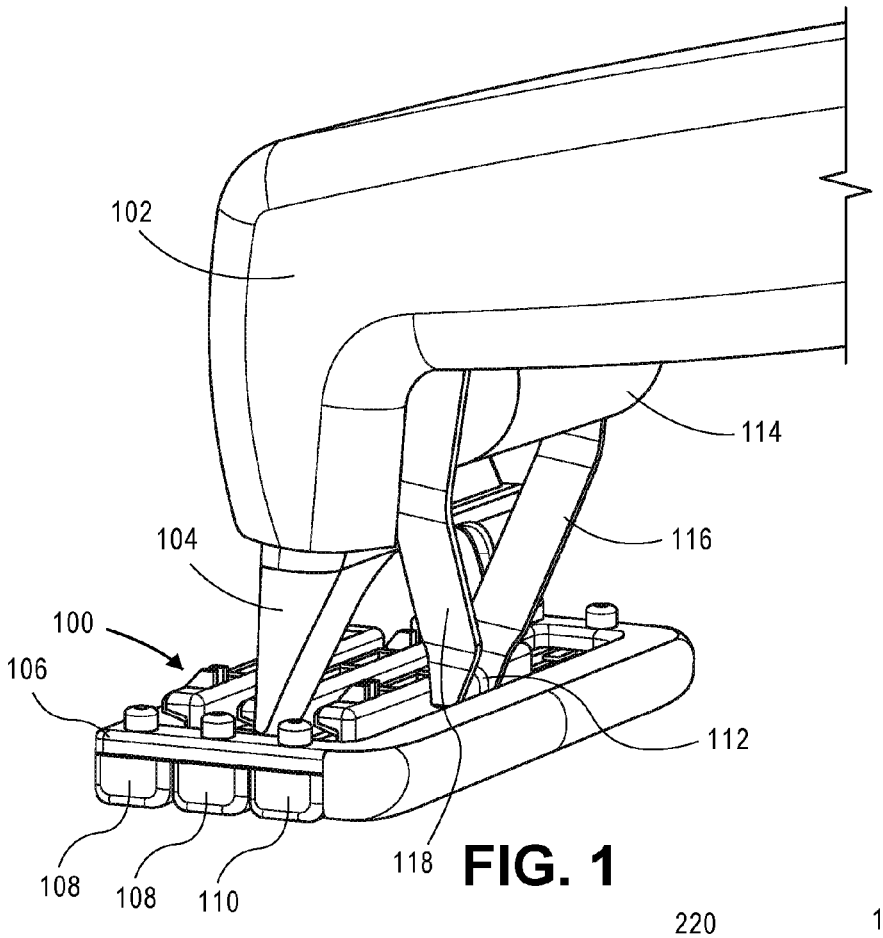
FIG. 1 is a perspective view of a shaving razor of one embodiment of the invention.

FIG. 1 is a perspective view of a shaving razor of one embodiment of the invention. A disposable shaving head 100 includes a yoke 104 that provides a handle attachment mechanism (not shown in this figure) to connect to handle 102. Yoke 104 bridges between flexible cross-members 106, to which are coupled a plurality of discreet cartridges 108, 110, each containing a blade that is exposed in the shaving plane during use. The construction of yoke, cross members and cartridges may be consistent with the description in U.S. Pat. No. 8,479,398 or co-pending U.S. Pat. No. 9,144,914 invented by the inventor hereof Cartridges 108 are coupled to cross-members 106 in a fixed manner. Cartridge 110 is coupled to allow it to reciprocate, as explained below in more detail with reference to FIG. 3. Cartridge 110 has coupled thereto a magnetic mass 112. As used herein, magnetic mass refers to a material that responds to a magnetic field. In one embodiment, magnetic mass 112 is a permanent magnet. In one embodiment, it is a rare earth magnet. Handle 102 includes a power source (not shown) such as a battery. In one embodiment, a single AAA battery is used. In other embodiments, a rechargeable battery, such as a lithium ion battery, may be employed. The power source powers a magnetic actuator 114, which generates a magnetic field responsive to the electric current. Magnetic actuator 114 may be a solenoid, electromagnetic coil, piezoelectric element or the like. Extending from the magnetic actuator 114 are arms 116 and 118. Arms 116 and 118 extend so as to be adjacent to magnetic mass 112. By switching the direction of current through applied to the magnetic actuator, the polarity of the magnetic field between the two arms can be alternated. In this manner, the magnetic mass 112 coupled to cartridge 110 can be driven back and forth between the magnetic arms 116 and 118, causing cartridge 110 to exhibit a reciprocating motion. As used herein "reciprocating motion" is motion lateral to a direction of shaving.

In this embodiment, since cartridge 110 contains the leading blade and is therefore responsible for a disproportionate amount of the cutting effort, by reciprocating this blade, the hair is cut more efficiently with reduced dulling of the blade. This has been found to significantly increase the useful life of shaving assembly 100. More specifically, the reciprocation results in a sawing effect when the blade encounters a hair. By analogy, a knife must be much sharper to cut with pressure alone than with a sawing motion. Similarly, here, the reciprocation allows the blade to cut more efficiently. It reduces the dulling effect on cutting and allows for more effective cutting with a duller blade than possible with conventional techniques. The more effective cutting reduces the pulling and tugging. Cartridges employing this reciprocating technique have been found to last up to a year without replacement.

Figure 2:
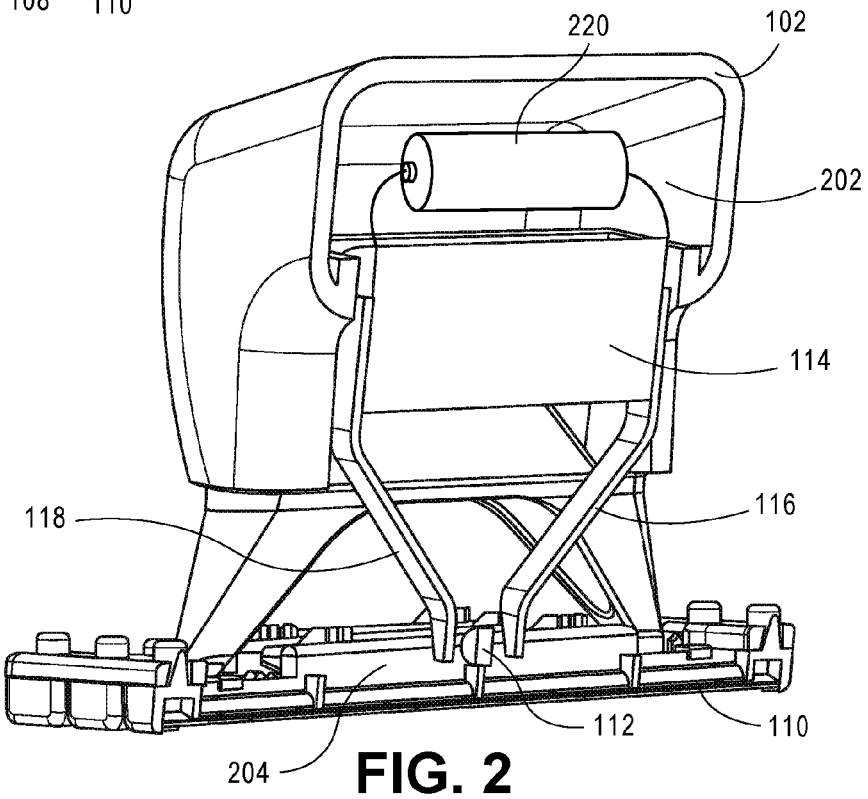
FIG. 2 is a sectional view of the embodiment of FIG. 1.

FIG. 2 is a sectional view of the embodiment of FIG. 1. In this view, the positioning of magnetic mass 112 between actuator arms 116 and 118 can be seen. Magnetic mass 112 may be coupled to leading blade 204 by adhesive, spot welding, or any other suitable manner for attachment. In one embodiment, the magnetic mass 112 is insert molded into cartridge 110. Handle 102 defines an internal space 202 in which the power source 220 and the magnetic actuator 114 may reside.

Figure 3:
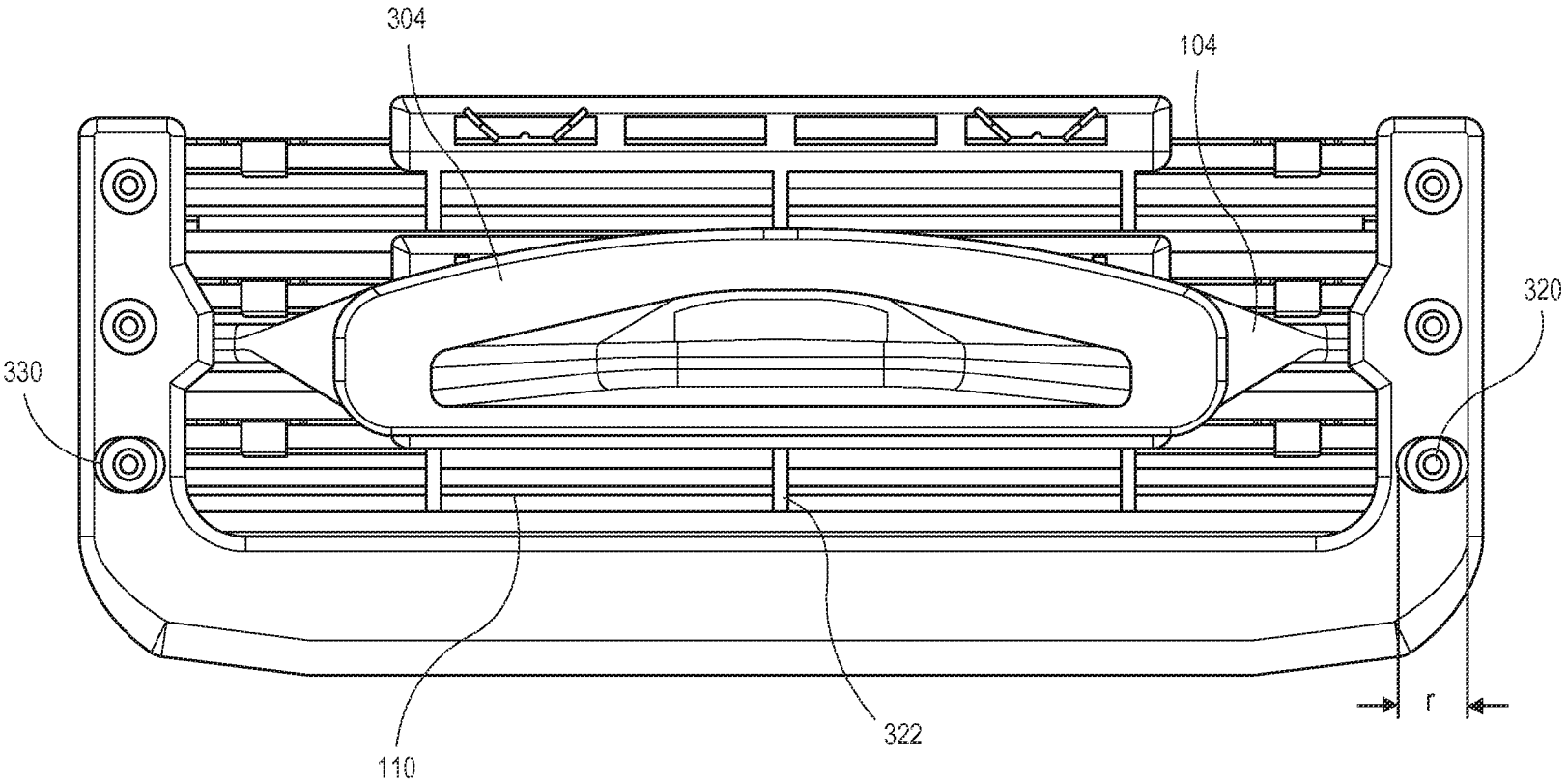
FIG. 3 is a view of the shaving assembly disconnected from the handle.

FIG. 3 is a view of the shaving assembly disconnected from the handle. In this view, handle attachment mechanism 304 is visible. The handle attachment mechanism is formed as part of the yoke and provides a male receiver for the corresponding female element of the handle. Various handle attachment mechanisms are noted in the art, and any suitable handle attachment mechanism could be employed. One suitable handle attachment is described in co-pending U.S. patent application Ser. No. 14/221,086 invented by the inventor hereof. Cartridge 110 has a central support 322 that provides a suitable place for attachment of the magnetic mass or coupling of a mechanical linkage as may be used with other embodiments of the invention such as described with reference to FIG. 4 below. Also visible in this view are slots 330 defined in cross members 106. Posts 320 of cartridge 110 couple cartridge 110 within the slots 330. The slots 330 define the maximum range (r) over which the blade of cartridge 110 can reciprocate.

Testing has revealed that reciprocation of less than 0.1 mm is not effective in increasing blade life or increasing the efficacy in cutting the hair to be shaved. Reciprocation greater than 0.5 mm significantly increases the risk of nicks and cuts during use. As a result the range r is chosen to be in the range of 0.1-0.5.mm and approximately 0.2 mm has be found to be effective without increased cut risk. While in some embodiments the arm 116 and 118 may limit the reciprocation of the blade, the slots 330 provide hard stops and ensure the blade will not move beyond that limit. This provides a safety margin in the event that any other restriction on the blade movement is compromised.

Figure 4:
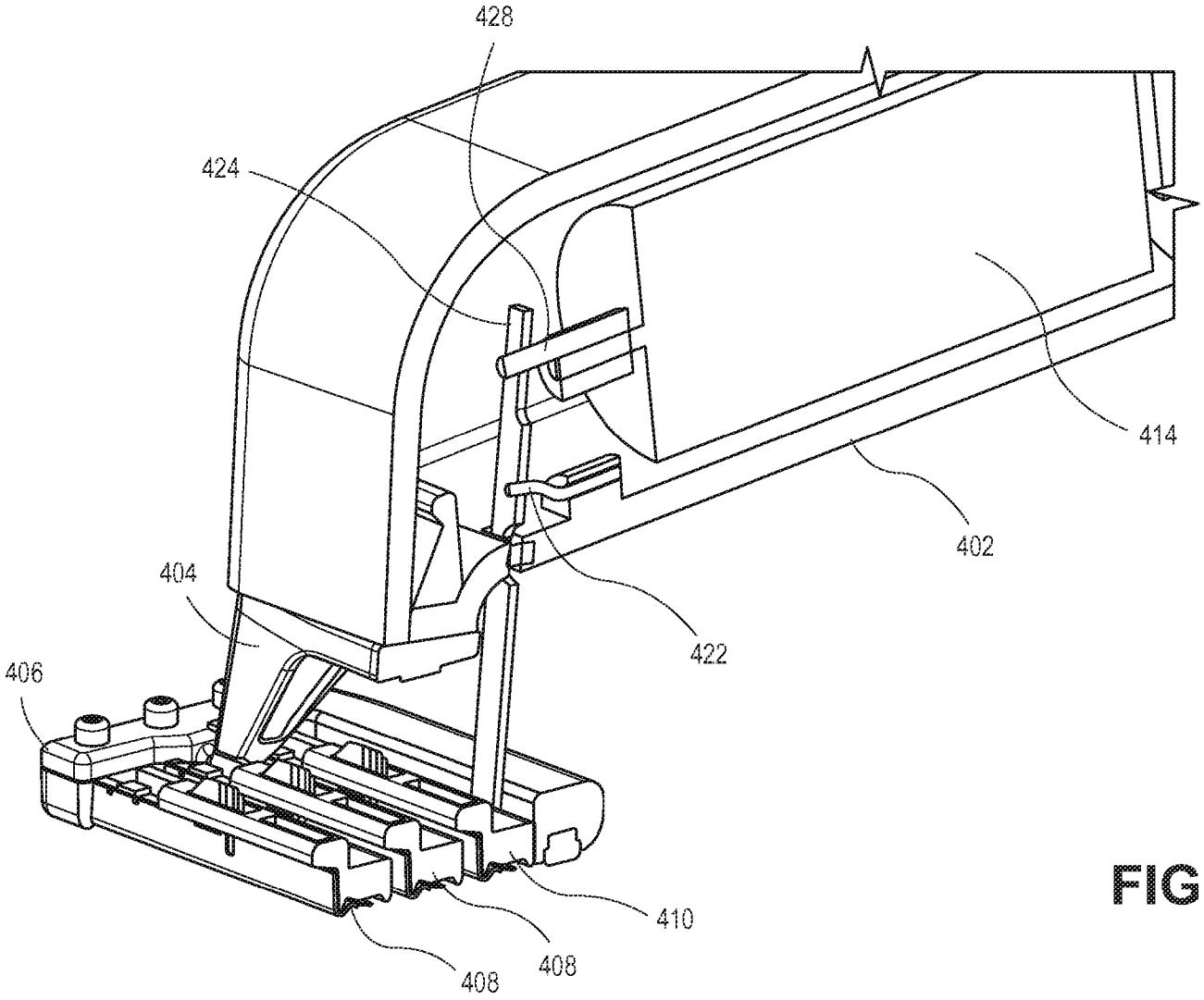
FIG. 4 is a sectional view of an alternative embodiment of the invention having a mechanical drive.

FIG. 4 is a sectional view of an alternative embodiment of the invention having a mechanical drive. Handle 402 contains a mechanical actuator 414 which may be, for example, a servo, a piezoelectric motor, dc electric motor or the like. Mechanical linkage 424 is engaged by the eccentric extension of, e.g., the motor shaft 428, and may be biased into engagement therewith. For example, a spring or other elastic bias member may press linkage 424 into engagement with shaft 428. Mechanical actuator 414 rotates shaft 428. The mechanical linkage 424 converts the rotation of the motor into reciprocating motion of the mobile cartridge 410. As with the embodiment described with reference to FIG. 3, cartridge 410 is coupled to cross-member 406 to permit a desired range of motion. Cartridges 408 are coupled in a fixed relation to 406. Cross-member 406 is coupled to yoke 404, which in turn is coupled in a mated relationship to handle 402.

As noted above, it is desirable to limit the relative motion between cartridges 410 and 408 to less than 0.5 mm. It has been found that relative motion in excess of 0.5 mm increases the risk of nicks and cuts for the user. It has also been found that a range of motion less than 0.1 mm fails to provide the desired utility. Thus, the range of motion between 0.1 and 0.5 mm is desirable (the reduced upper bound provides an additional safety margin), and 0.2 mm has been found satisfactory. As shown in FIG. 3, the cross-members 406 may provide hard stops for the range of motion. In other embodiments, the movement of the mechanical linkage 424 is constrained by hard stops 422 within the handle. Cross-member 406 is coupled to yoke 404, which in turn is coupled in a mated relationship to handle 402. In other embodiments the coupling of the linkage 424 between the blade and shaft 428 limits the range of motion to the desired range.

Figure 5:
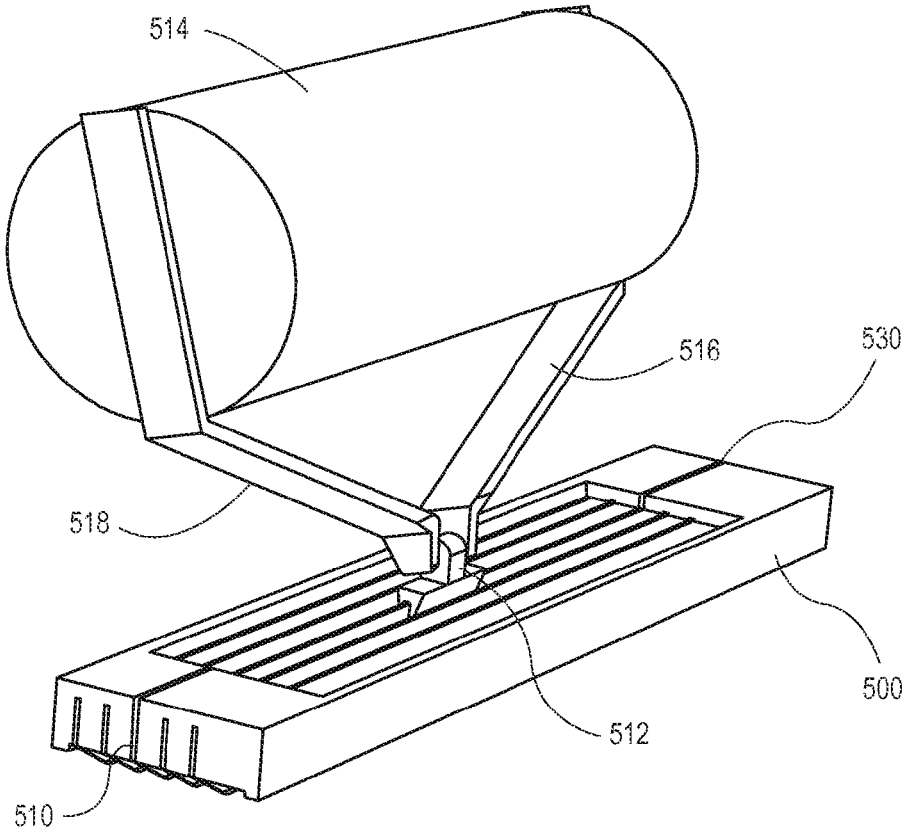
FIG. 5 is a schematic view of an alternative embodiment of the invention.

FIG. 5 is a schematic view of an alternative embodiment of the invention. In the embodiment the shaving head is a single multi-blade cartridge 500. A magnetic actuator 514 applies alternating polarity magnetic fields between field arms 516 and 518, which act on magnetic mass 512. It is coupled to one blade of the multi-blade razor cartridge 500. Moveable blade 510 resides in a slot 530 that allows it to reciprocate in a range of motion relative to the other blades of cartridge 500. In this example, moveable blade 510 is the middle blade of a five-blade cartridge. It is within the scope and contemplation of the invention for any of the blades to be selected as the moveable blade. However, where the leading blade is at least one of the moveable blades, the greatest increase in the longevity of the cartridge and improved efficacy of shaving is achieved.

Figure 6:
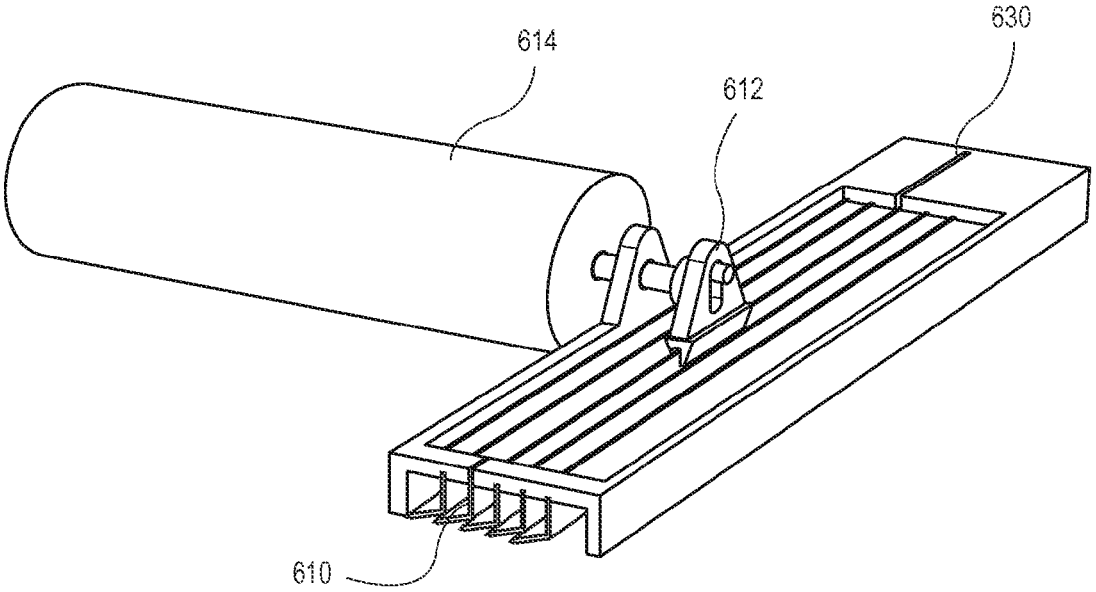
FIG. 6 is a schematic diagram of an alternative embodiment of the invention with the mechanical actuator.

FIG. 6 is a schematic diagram of an alternative embodiment of the invention with the mechanical actuator. In FIG. 6, a mechanical actuator is coupled to a mechanical link 612 that in turn is coupled to mobile blade 610. A slot 630 is defined to provide the desired range of motion. Analogous to the embodiment of FIG. 5, the moveable blade could be selected to be any individual blade, but the leading blade achieves the greatest improvement in efficacy.

Figure 7:
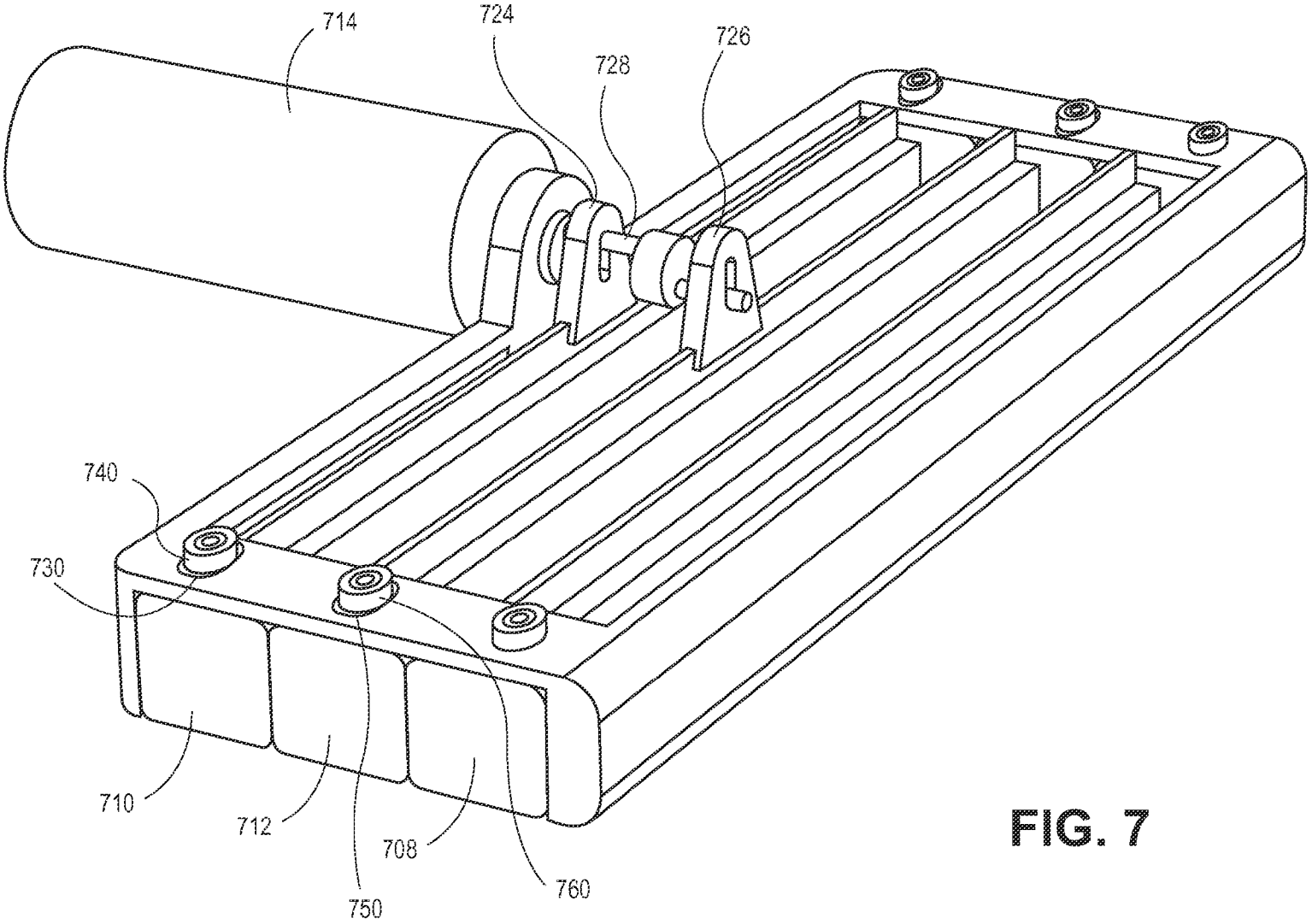
FIG. 7 is a schematic view of an embodiment of the invention in which plural blades are mobile.

FIG. 7 is a schematic view of an embodiment of the invention in which plural blades are mobile. Mechanical actuator 714 is coupled by its shaft 728 to a pair of mechanical linkages 724 and 726, which are respectively coupled to mobile blades 710 and 712 of blade assembly 700. Cartridge 708 is coupled in fixed relation within the assembly. Cartridges 710 and 712 reciprocate in opposite directions; that is when cartridge 710 moves left, cartridge 712 moves right. As shown, posts 740 and 760 engage slots 730 and 750 respectively. The slots 730, 750 define the range of motion of the blades. In this embodiment where multiple blades are moving, it is important that the relative motion between the blades remains less than 0.5 mm. Thus, where the blades move in opposite directions, each blade should move no more than 0.2 mm maintaining the relative motion within an acceptable range to avoid nicks and cuts for the user. Each blade moving 0.1 mm such that the aggregate relative movement is 0.2 mm has been found effective. In the shown embodiment, the mechanical linkages 724 and 726 limit the range of motion of the cartridges 710 and 712 respectively.

While this embodiment uses a mechanical actuator, embodiments with a magnetic actuator moving more than one blade are also within the scope and contemplation of the invention. For example, the embodiment of FIG. 1 could be provided with two moveable cartridges and with magnetic masses having oppositely oriented polarities (e.g., leading blade magnet is oriented NS and the subsequent blade magnet is orient SN) so that when the magnetic field is applied by the arms, the blades reciprocate in opposite directions.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A shaving razor comprising:

a handle;

a power source residing within the handle;

a shaving head containing at least two razor blade assemblies, each of the blade assemblies include [blades which] *at least one blade each having a cutting edge, wherein the cutting edges of the blade assemblies* reside in a single cutting plane, at least a first of the blade assemblies is moveably coupled within the shaving head so that the first blade assembly can be driven to translate laterally within a zone of motion; and an actuator coupled to the power source, the actuator to apply a force that drives the first blade assembly to reciprocate within the zone of motion to translate relative to an adjacent one of the blade assemblies.

2. The shaving razor of claim 1 [where in] *wherein* the actuator comprises:

one of an electric motor, a piezo electric motor or a servo.

3. The shaving razor of claim 1 wherein the force applied by the actuator is a magnetic force to drive the first blade assembly.

4. The shaving razor of claim 1 wherein the force applied by the actuator is a mechanical force to drive the first blade assembly.

5. The shaving razor of claim 1 wherein the zone of motion is defined to be in the range of 0.1 mm to 0.5 mm relative to the adjacent blade assembly.

6. The shaving razor of claim 1 wherein the actuator comprises:

a magnetic actuator.

7. The shaving razor of claim 6 further comprising:

a magnetic mass coupled to the first blade assembly and driven by the magnetic actuator.

8. The shaving razor of claim 1 further comprising a second blade assembly that is moveably coupled to the [razor] *shaving* head so as to translate within a second zone of motion via a force applied by the actuator and wherein the first and second blade assemblies translate in opposite directions within their respective zones of motion*, wherein the second blade assembly is one of the at least two blade assemblies*.

9. The shaving razor of claim 8 wherein each of the zones of motion are defined to be in a range of 0.1 mm to 0.5 mm relative to at least the adjacent blade assembly.

10. The shaving razor of claim 8 wherein the actuator applies a magnetic force to drive the first and second blade assemblies.

11. The shaving razor of claim 8 wherein the first and second blade assemblies are adjacent to each other within the shaving head.

*12. The shaving razor of claim 1 wherein a second of the blade assemblies is moveably coupled within the shaving head so that the second blade assembly can be driven to translate laterally within a second zone of motion.*

*13. A shaving razor comprising:*

*a handle;*

*a shaving head containing at least two razor blade assemblies, each of the blade assemblies include at least one blade, each of a first blade assembly and a second blade assembly of the at least two blade assemblies are moveably coupled within the shaving head so that the first blade assembly can be driven to translate laterally within a first zone of motion and the second blade assembly can be driven to translate in a second zone of motion; and*

*one or more actuators coupled to, in use, receive power from a power source, the actuators to apply a force that drives the first blade assembly to reciprocate within the first zone of motion and the second blade assembly to reciprocate within the second zone of motion, wherein the translation of the first blade assembly is in an opposite direction relative to the translation of the second blade assembly, and*

*wherein a first blade in the first blade assembly and a second blade in the second blade assembly are ones of the at least one blade and each have a single substantially straight cutting edge.*

*14. The shaving razor of claim 13 wherein each of the zones of motion are defined to be in a range of 0.1 mm to 0.5 mm relative to each other.*

*15. The shaving razor of claim 13 wherein the first and second blade assemblies are adjacent to each other within the shaving head.*

* * * * *